United States Patent [19]
Eidson et al.

[11] Patent Number: 5,774,377
[45] Date of Patent: Jun. 30, 1998

[54] METHOD AND APPARATUS FOR MONITORING A SUBSYSTEM WITHIN A DISTRIBUTED SYSTEM FOR PROVIDING AN ARCHIVE OF EVENTS WITHIN A CERTAIN TIME OF A TRAP CONDITION

[75] Inventors: John C. Eidson, Palo Alto; Keith Edward Moore, Mountain View, both of Calif.

[73] Assignee: Hewlett-Packard Company, Palo Alto, Calif.

[21] Appl. No.: 737,621

[22] Filed: Jul. 30, 1991

[51] Int. Cl.$^6$ .................................................. H04B 17/00
[52] U.S. Cl. .......................................... 364/550; 395/200
[58] Field of Search .................................. 364/131, 132, 364/133, 483, 492, 551.01, 551.02, 550; 371/10.1, 19; 395/200, 900

[56] References Cited

U.S. PATENT DOCUMENTS

| | | | |
|---|---|---|---|
| 4,397,021 | 8/1983 | Lloyd et al. | 371/20 |
| 4,399,502 | 8/1983 | MacDonald et al. | 364/189 |
| 4,400,783 | 8/1983 | Locke, Jr. et al. | 364/483 |
| 4,402,055 | 8/1983 | Lloyd et al. | 364/579 |
| 4,530,091 | 7/1985 | Crockett | 370/60 |
| 4,581,738 | 4/1986 | Miller et al. | 371/18 |
| 4,584,651 | 4/1986 | Carey, Jr. et al. | 364/483 |
| 4,590,550 | 5/1986 | Eilert et al. | |
| 4,627,055 | 12/1986 | Mori et al. | 371/16 |
| 4,628,443 | 12/1986 | Rickard et al. | 364/184 |
| 4,630,224 | 12/1986 | Sollman | 364/550 |
| 4,633,421 | 12/1986 | Watson, Jr. et al. | 364/569 |
| 4,672,530 | 6/1987 | Schuss | 364/133 |
| 4,696,019 | 9/1987 | Tulpule et al. | 375/107 |
| 4,703,325 | 10/1987 | Chamberlin et al. | 340/825.17 |
| 4,709,347 | 11/1987 | Kirk. | |
| 4,801,870 | 1/1989 | Eichelberger et al. | 324/73 R |
| 4,806,929 | 2/1989 | Nishijima et al. | 340/825.06 |

(List continued on next page.)

FOREIGN PATENT DOCUMENTS 107919  2/1989  Taiwan .

OTHER PUBLICATIONS

M. Zieher and M. Zitterbart, "NETMON–A Distributed Monitoring System", EFOC/LAN Jun. 29–Jul. 1, 1988, pp. 452–457.

Jeffrey J.P. Tsai et al., "A Noninvasive Architecture to Monitor Real–Time Distributed Systems", Computer, Mar. 1990, pp. 11–23.International Computer Science Institute, "Monitoring and Management–Support of Distributed Systems 1988", Nov. 1988.

International Computer Science Institute, "Behavior and Performance Analysis of Distributed Systems Using a Hybrid Monitor", May 1989.

Hermann Kopetz et al., "Distributed Fault–Tolerant Real–Time Systems: The Mars Approach", IEEE Micro, Feb. 1989, pp. 25–40

(List continued on next page.)

*Primary Examiner*—Emanuel T. Voeltz
*Assistant Examiner*—Thomas Peeso

[57] ABSTRACT

A method and apparatus for monitoring the behavior over time of a distributed system. Time-stamped data descriptive of events at one subsystem are placed into a local buffer. The subsystem is notified of the time when a trap condition occurs at another subsystem. Data having a time-stamp within a certain interval of the occurrence of the trap condition are archived to provide a history of the system for later analysis. Time is determined by a local clock in each subsystem. These clocks are synchronized to ensure accurate correlation between events at different subsystems. Trap conditions are categorized and data descriptive of subsystem states are classified to facilitate selective notification of one or more other subsystems, and selective retention of the data, depending on which category of trap condition has occurred and which class of data has been collected.

18 Claims, 2 Drawing Sheets

U.S. PATENT DOCUMENTS

| | | |
|---|---|---|
| 4,814,971 | 3/1989 | Thatte .................................... 395/575 |
| 4,831,558 | 5/1989 | Shoup .................................... 364/550 |
| 4,843,557 | 6/1989 | Ina et al. ............................. 364/431.77 |
| 4,882,739 | 11/1989 | Potash et al. ......................... 375/109 |
| 4,893,318 | 1/1990 | Potash .................................. 375/109 |
| 4,894,846 | 1/1990 | Fine ..................................... 375/107 |
| 4,907,167 | 3/1990 | Skeirik ................................. 364/500 |
| 4,918,652 | 4/1990 | Bennington et al. . |
| 4,945,486 | 7/1990 | Nitschke et al. .................... 364/431.11 |
| 4,962,473 | 10/1990 | Crain .................................... 364/423 |
| 4,991,174 | 2/1991 | Mori et al. ............................ 371/15.1 |
| 5,153,837 | 10/1992 | Shaffer et al. ....................... 364/464.4 |
| 5,155,850 | 10/1992 | Janis et al. ............................ 395/600 |

OTHER PUBLICATIONS

IBM Technical Disclosure Bulletin, vol. 34, No. 7A, Dec. 1991, New York, "Merging of Trace Data from Distributed Systems", pp. 165–166.

J. P. Kearns, "Simultaneous Regions: A Framework for the Consistent Monitoring of Distributed Systems", Proceedings of the 9th International Conference on Distributed Computing Systems, Jun. 5, 1989, Newport Beach, California, pp. 61–68.

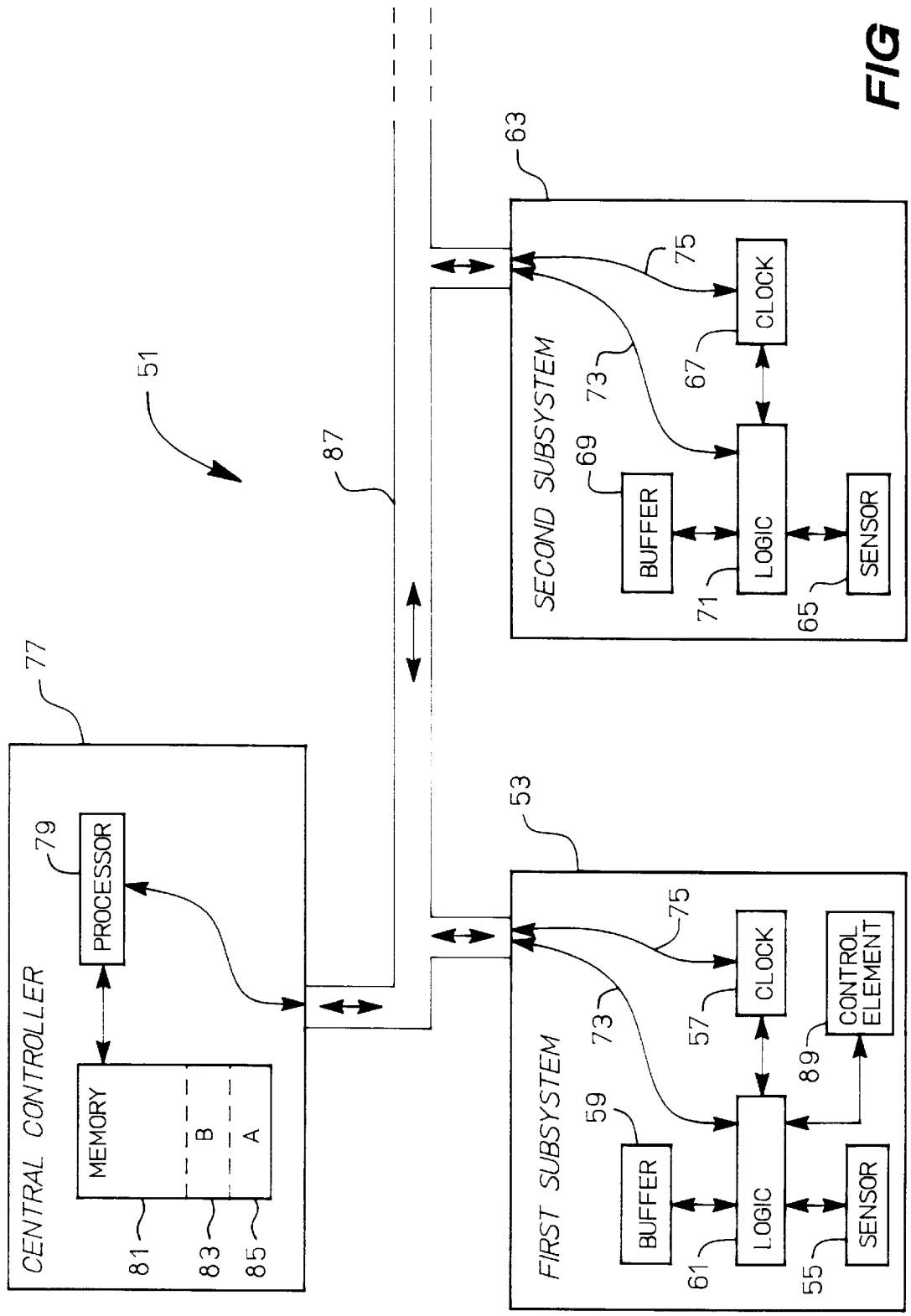

METHOD AND APPARATUS FOR MONITORING A SUBSYSTEM WITHIN A DISTRIBUTED SYSTEM FOR PROVIDING AN ARCHIVE OF EVENTS WITHIN A CERTAIN TIME OF A TRAP CONDITION

BACKGROUND

This invention relates generally to distributed systems and more particularly to a method and apparatus for monitoring the behavior of a plurality of interacting subsystems of a distributed system such as an electronic instrument and computer system by means of time-stamped observations.

A distributed system typically contains a plurality of instruments, processors, subsidiary computers, and other electronic measurement and control devices. Such devices are collectively referred to herein as "subsystems". In many distributed systems, especially in the area of real time measurement and control, the various subsystems must be synchronized with one another.

The requirement that the subsystems be synchronized affects both the design and the debugging of the system. The design of a distributed system typically includes overall system specification, hardware construction, and software development, whereas debugging refers to correcting deviation of actual behavior from expected behavior. Debugging often occurs in a top-down fashion, which means that major state changes in a subsystem are monitored until an erroneous state or transition is observed, an attempt is made to replicate the error condition, and subsidiary states or transitions are monitored to determine causes and effects. This process is continued until the fault is isolated.

Synchronizing the subsystems of a distributed system has usually been accomplished by controlling all the subsystems from a central controller in a master-slave manner. In such a centrally-controlled system, the time behavior of each subsystem can be observed from the central controller.

In a system where the subsystems must act in parallel or with relative autonomy, it is difficult to observe the time behavior of each subsystem in relation to the behavior of the other subsystems. A typical approach has been to use external instruments such as bus analyzers, oscilloscopes and logic analyzers to make the desired observations. Monitoring the flow of timing and control signals on a communication network among the subsystems or querying the subsystems often results in disrupting the normal time behavior of the system, thereby making the observations unreliable. In addition, it is difficult to correlate the order of events during parallel state transitions and to identify synchronization and other timing errors. The following are among the difficulties that may be encountered:

(1) timing skew (a result of geographic distribution of the subsystems), (2) transmission delay (a delay between the time when an event occurs and the time when the occurrence of the event is announced), (3) propagation delay (a delay between the time when a message is sent and the time when it is received), (4) message latency (messages may be delivered but not acted upon immediately), (5) insufficient state information (context is needed to interpret messages), (6) measurement disturbance (interrogation of the system to retrieve context affects the system behavior), and (7) rate differences (if events occur at different rates, identifying trigger conditions and storing state information become very difficult).

Various aspects of these and other difficulties associated with monitoring subsystems of a distributed system are discussed, for example, in U.S. Pat. No. 4,400,783, issued to Locke et al.; U.S. Pat. No. 4,630,224, issued to Sollman; U.S. Pat. No. 4,703,325, issued to Chamberlain et al.; Kopetz et al., "Distributed Fault-Tolerant Real-Time Systems: The Mars Approach," *Micro* (IEEE), February 1989, pp. 25–40; and Zieher and Zitterbart, "NETMON—A Distributed Monitoring System", presented at the Sixth European Fiber Optic Communications & Local Area Networks Exposition, Jun. 29–Jul. 1, 1988, Amsterdam, The Netherlands.

Tsai, Fang and Chen in "A Noninvasive Architecture to Monitor Real-Time Distributed Systems", *Computer* (IEEE), March 1990, pp. 11–23, have identified some problems of monitoring a distributed computing system. One such problem is that computations performed in such a system are nondeterministic and nonreproducible because of the presence of asynchronous parallel processes. This makes it difficult or impossible to determine the execution order of instructions belonging to processes associated with separate subsystems.

Another problem encountered in monitoring a distributed system is that the system must comply with timing constraints imposed by real-world processes carried out on the various subsystems. Thus, any monitoring activity must not interfere with the real-time distributed computing environment.

A third problem is that any communications delay between subsystems can cause improper synchronization among the processors and make it difficult to determine the actual time of an event and the state of the system at that time.

From the foregoing it will be apparent that there is a need for a way to monitor the behavior of each of a plurality of subsystems of a distributed system as a function of time. The subsystems may be computers, processors, instruments or other similar devices that interact with one another. A record of the time at which any unusual event occurs and the times at which various other events occur before or after the occurrence of the unusual event must be preserved for subsequent analysis without interfering with the operation of the system.

SUMMARY OF THE INVENTION

The present invention provides a method and apparatus for monitoring the behavior over time of various subsystems of a distributed system without interfering with normal operation of the system. Time-stamped data descriptive of events at a subsystem are placed into a local buffer, the subsystem is notified of the time when a trap condition occurs, and data having a time-stamp within a certain interval of the occurrence of the trap condition are archived for later analysis.

Briefly and in general terms, a method of monitoring a distributed system according to the invention includes the steps of collecting time-stamped data respecting the state of one of the subsystems, placing the data in a buffer, detecting the occurrence of a trap condition, determining the time at which the trap condition occurs, notifying of the occurrence of the trap condition and its time of occurrence, and archiving any data having a time-stamp that is within a desired interval of the time of the occurrence of the trap condition. The archived data provide a history of the state of the subsystem.

Typically the occurrence of the trap condition is detected by a second subsystem and the time of the occurrence is determined by a local clock in that subsystem. This clock is synchronized with a local clock in the first subsystem so that events at the first subsystem can be correlated with the time at which the trap condition occurs at the second subsystem.

In a preferred embodiment data respecting the states of a subsystem are classified into any of a plurality of classes, and trap conditions are categorized into any of a plurality of categories. This makes it convenient for a subsystem at which trap conditions are being observed to selectively notify one or more other subsystems depending on which category of trap condition has occurred. Similarly, a subsystem which receives a notification responds selectively according to the category and class information. For example, the subsystem receiving the notification may send data from its buffer to be archived at any of several local or remote storage locations depending on which category of trap condition has occurred and which class of time-stamped data is to be archived, or some data may be archived and other data discarded entirely based on these considerations.

In one embodiment the step of archiving the data also includes performing an interruptive procedure, such as pausing a subsystem for a certain interval of time after the trap condition has occurred, to find out any effects of the interruptive procedure on any of the subsystems.

A distributed system embodying the invention includes a plurality of subsystems each having a sensor, a clock, a buffer, and logic means such as a local controller for time-stamping data collected by the sensor, placing the time-stamped data in the buffer, and communicating with other subsystems. A communication link such as a direct wired circuit, a modem and a telephone line, or a local area network carries signals between the subsystems.

If the sensor at one of the subsystems detects an event, for example a change in the state of the subsystem, data indicating the occurrence of the event are time-stamped and placed in the buffer for temporary storage. Then, if a trap condition occurs, a signal indicating the fact and the time of that occurrence are sent to the first subsystem. This causes the first subsystem to archive any data having a time-stamp within a desired interval of time of the occurrence of the trap condition, for example by preserving the data in the buffer or by sending it to another memory or another location such as a central control unit for storage.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 2 is a block diagram of a distributed system configured according to a preferred embodiment of the invention.

DETAILED DESCRIPTION

Figure 1:
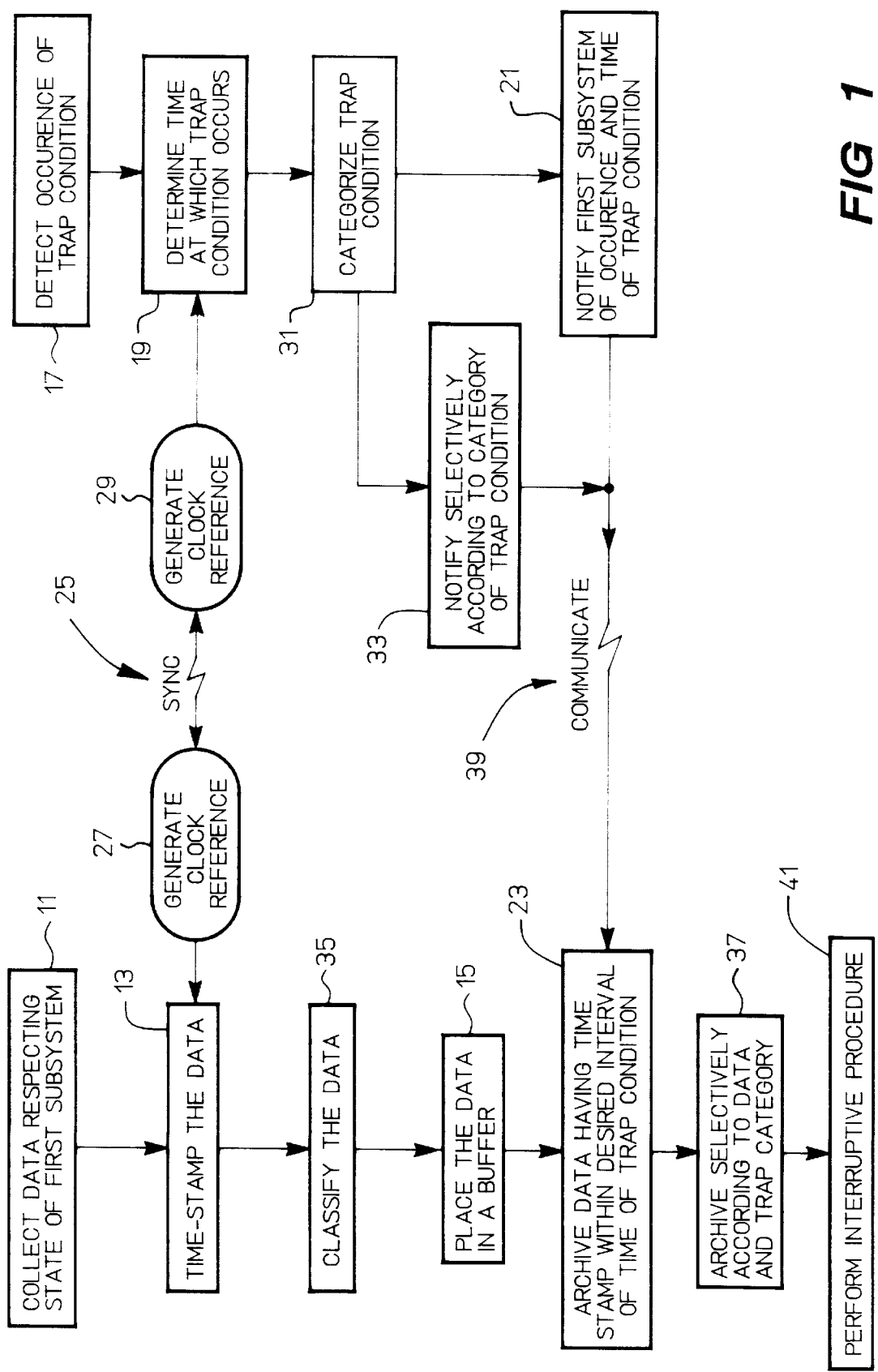
FIG. 1 is a flow chart depicting a preferred embodiment of a method of monitoring a distributed system according to the invention.

As shown in the drawings for purposes of illustration, the invention is embodied in a novel method and apparatus for monitoring the behavior over time of a plurality of subsystems of a distributed system. Monitoring the behavior of such a system by intercepting signals flowing between the subsystems has not been satisfactory because of the difficulty of correlating parallel events and because such monitoring tends to disrupt normal operation of the system.

In accordance with the invention, time-stamped data descriptive of events at one subsystem are placed into a local buffer. When a trap condition occurs, any data having a time-stamp within a certain interval of the time of occurrence of the trap condition are archived for later analysis. Local clocks in the subsystems are synchronized to ensure that events occurring at the different subsystems can be accurately correlated. The invention provides a chronological history of events at various subsystems of the system being monitored without disrupting normal operation of the system, facilitating debugging and understanding of the operation of the system.

As shown in flowchart form in FIG. 1, a method of monitoring the behavior over time of a plurality of interacting subsystems of a distributed system comprises collecting (11) and time-stamping (13) data respecting the state of a first subsystem, placing (15) the data in a buffer, detecting (17) the occurrence of a trap condition, determining (19) the time at which the trap condition occurs, notifying (21) the first subsystem of the occurrence of the trap condition and its time of occurrence, and archiving (23) any data having a time-stamp within a desired interval of the time of the occurrence of the trap condition, thereby providing a history of the state of the first subsystem during the desired time interval.

In a typical embodiment the steps of detecting the occurrence of the trap condition, determining the time at which the trap condition occurs, and notifying the first subsystem are carried out by a second subsystem. In this embodiment the method includes the step of synchronizing (25) a clock reference (27) in the first subsystem with a clock reference (29) in the second subsystem.

Preferably the trap condition is categorized (31) as belonging to one of a plurality of categories. The step of notifying of the occurrence of the trap condition optionally comprises selectively notifying (33) according to whether the trap condition belongs to a preselected category. For example, the notification might be sent only if the detected trap condition is a temperature change as opposed to a voltage change, or the notification might be sent to one subsystem if the detected trap condition is a positive temperature change and to another subsystem if the detected trap condition is a negative temperature change.

The time-stamped data preferably are classified (35) as belonging to one of a plurality of classes and the step of archiving the data optionally comprises archiving selectively (37) according to the class of the data. The category of the trap condition may also be used for selectively archiving the data. For example, data to be archived may be sent to any of several different local or remote storage locations according to one or both of these factors. These storage locations might be a portion of the buffer or of some other local storage, or a remote memory in a central controller or in another subsystem. Or the data may be selectively discarded or archived according to the category of the trap condition or the class of the data.

The second subsystem communicates (39) with the first subsystem by any suitable means of communication. The communication is depicted as unidirectional in FIG. 1, but of course the communication may be bidirectional. Furthermore, each subsystem may notify the other of the occurrence of various trap conditions, as will be discussed presently in more detail.

Although an advantage of the present invention is its ability to provide a history of the system without disrupting the operation of the system, in one embodiment the step of archiving the data also includes deliberately performing (41) an interruptive procedure. For example, a subsystem may be told to pause for a certain interval of time after a trap condition has occurred so that the effect of the pause may be analyzed by examining archived data provided by the same or a different subsystem during or following the pause.

A distributed system, generally 51, embodying the invention is shown in FIG. 2. The system includes a first subsystem 53 which has a sensor 55 for collecting data respecting the state of the subsystem 53, a clock 57, a buffer 59 such as a random access memory, and logic means 61 such as a local controller responsive to the sensor and the clock means to time-stamp data collected by the sensor and to place the time-stamped data in the buffer.

Similarly, a second subsystem 63 has a sensor 65, a clock 67, optionally a buffer 69, and logic means 71. The logic means 71 is responsive to the sensor 65 and the clock 67 to determine the time of occurrence of a trap condition detected by the sensor and to send a signal notifying the first subsystem 53 of the occurrence of the trap condition and the time of occurrence.

Communication means indicated by a line 73 carries signals between the subsystems. The communication means may be, for example, a wire pair, modems and a telephone line, a local area network, a fiber optic link, or most any system for conveying information from one electronic device to another.

The first logic means 61 archives any data having a time stamp within a desired interval of the time of occurrence of the trap condition and thereby provides a history of the state of the first subsystem 53 during the desired time interval.

The clocks 57 and 67 are preferably synchronized. This is done by any convenient method. For example, the clocks may communicate directly with each another as indicated by a line 75, or they may be synchronized through their respective logic means 61 and 71. In an alternate embodiment a central controller 77 uses a processor 79 to regulate the system and to synchronize the clocks. The central controller 77 has a central memory 81 which may be partitioned into A and B subparts 83 and 85 for archiving data from the various subsystems.

Only two subsystems 53 and 63 are shown. These subsystems may be physically collocated or they may be separated by several meters or even many kilometers and interconnected with each other and with the central controller by some convenient communication medium as indicated by a communication channel 87. It will be apparent that a typical distributed system may have many more than two subsystems and that any of such subsystems may notify any one or more of the others of the occurrence of a trap condition, with the result that some or all of the subsystems receiving the notice may archive data descriptive of any changes in their respective statuses during various different time intervals.

Optionally the subsystem 53 includes means such as a control element 89 responsive to the first logic means 61 to interrupt a portion of the system. The interruption may take various forms such as causing some part of the system to pause or actively perturbing the system, for example by injecting a signal or activating a mechanical device, so that time-stamped data indicative of the states of various subsystems before and after the interruption can be compared during the later analysis of the history of the system.

As has already been indicated, a subsystem may be a computer subsystem such as a terminal, a workstation or even a large computer, a measuring instrument such as a voltmeter or a thermometer; or any device that can generate data and take measurements or perform similar tasks.

Each of the buffers 59 and 69 may be implemented as a queue or randomly addressable register through which passes a continuous stream of data and associated time stamps. At any one time the buffer 59, for example, will contain a sequence of consecutive information items and associated time stamps for a certain time interval, where the number of events recorded is determined in part by the length of the register and the rate of arrival of data at the buffer. Each subsystem such as the subsystem 53 may be attached to or built into an instrument or other device (not explicitly shown) that monitors a process occurring in the real world and provides a stream of measurement data.

Data need not be kept permanently in the buffer, but they must be kept there long enough to ensure their availability if they are selected for archiving. For example, if it is desired to identify and analyze any states assumed by a certain subsystem between ten milliseconds before and ten milliseconds after the occurrence of a certain trap condition, then all such data must be kept in the buffer for at least ten milliseconds. Thus, upon receiving notification that the trap condition has occurred, all data for the preceding ten milliseconds are transferred from the buffer into permanent archival storage. Any data arriving in the buffer within ten milliseconds thereafter are likewise archived. In addition, it may be necessary to allow for communication delay. Thus, if it is known that it may take as much as, say, thirty milliseconds for a message to arrive, then the data must be kept in the buffer for that additional amount of time.

The capability of keeping the data in the buffer long enough to compensate for communication delays allows the system to deliberately delay sending a notification of the occurrence of a trap condition without adversely affecting the monitoring. This makes it possible to avoid any disruption of system operation such as might otherwise result from overloading a limited-capacity communication channel by trying to send the notification of the trap condition at the same time as some other part of the system also is attempting to use the same channel.

The logic means 71 contains (or may obtain from the buffer 69 or from the central controller 77) a predetermined set of "trap conditions", which are descriptions of particular or unusual statuses, events, or changes in state. For example, a trap condition might be receipt or issuance of a control message to another subsystem, a change in an external state of an instrument to which the subsystem (acting as a detector) is attached, a change of internal state from one mode of operation to another, production of a predetermined data item by an instrument, receipt of an externally-generated signal, a malfunction, or the passage of a predetermined amount of time.

Each trap condition is associated with one or more values descriptive of the state of another subsystem for which a time history should be preserved for later analysis. For example, if a voltage exceeds a predetermined magnitude at a certain time, it might be desired to know the temperature of a certain transistor during the ten minutes preceding the time at which the voltage exceeded said predetermined magnitude. Thus, the subsystem which monitors the voltage would send a notification to the subsystem which has been keeping a record of the temperature, thereby causing the latter subsystem to save its temperature records for the preceding ten minutes.

It will be apparent that a single subsystem could perform both the function of detecting the trap condition and the function of collecting and archiving the data. In some distributed systems it may be advantageous to do this. However, an important advantage of the invention, specifically the ability to correlate events occurring at different locations of a system without disrupting the operation of the system, is not attained if the invention is embodied in only a single subsystem.

Trap conditions may be categorized. For example, it might be that only an abrupt change of voltage is of interest, in which case the voltage monitoring subsystem might send notifications only if the voltage is increasing at a predetermined rate when it exceeds the predetermined magnitude. Similarly, data being collected and placed in a buffer may be classified. Depending on the classification of the data or on the category of the trap condition or both, the data may be discarded or stored in one or more storage locations.

The subsystem that receives notification of a trap condition may act upon the information immediately or it may delay acting for some period of time such as, for example, ten milliseconds or ten minutes, in order to accumulate information on how the subsystem responds to the occurrence of the trap condition. Of course, as an alternate way of accomplishing the same thing, the subsystem that detects the trap condition may delay sending the notice.

Debugging of the hardware or software responsible for performance of tasks of a single, isolated subsystem is relatively straightforward. The invention is of special value in debugging of hardware or software responsible for joint or concurrent performance of tasks and interactions between two or more subsystems.

A detailed picture of the time evolution of the entire system of subsystems can be reconstructed by sorting the various events in time based upon the time stamps associated with each of these events as stored by the various subsystems. This information is invaluable in debugging a system of interacting subsystems or in optimizing the performance of such a system as a function of time. The information is presented in any suitable form, such as textual, graphic, audible, or a direct input to a computer.

From the foregoing it will be appreciated that the method and apparatus of the invention enable a user to observe the system state time evolution of a distributed system easily and conveniently. The user receives a precise time history of the various events in the system notwithstanding the existence of asynchronous parallel processes, which in the past have made it difficult or impossible to determine the execution order of instructions belonging to processes associated with separate subsystems. The monitoring does not interfere with any timing constraints imposed by a need to monitor real-world events in real time. Delays in communication have no adverse effect. Monitoring according to the invention does not disrupt the normal time behavior of the interacting subsystems. Complex and cumbersome instruments such as logic analyzers are not required.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A method of automatically monitoring the behavior over time of a plurality of interacting subsystems of a distributed system, the method comprising the following steps carried out automatically by the interacting subsystems:

collecting data respecting a first subsystem by using data collection means that is local to the first subsystem;

time-stamping the data;

placing the data in a local buffer in the first subsystem;

detecting occurrence of a trap condition by means of a sensor that is local to a second subsystem;

determining, locally in the second subsystem, at what time the trap condition occurs;

notifying the first subsystem of the occurrence of the trap condition and its time of occurrence; and archiving any data that have been placed in the local buffer and that carry a time-stamp within a desired interval of the time of the occurrence of the trap condition and thereby providing a history of the first subsystem during the desired time interval.

2. A method as in claim 1 wherein:

the step of time-stamping the data is carried out by reference to a local clock reference in the first subsystem;

the step of determining at what time the trap condition occurs is carried out by reference to a local clock reference in the second subsystem; and the method further comprises, prior to the step of time-stamping the data, synchronizing the local clock references in the first and second subsystems with each other.

3. A method as in claim 1 and further comprising categorizing the trap condition as belonging to one of a plurality of categories.

4. A method as in claim 3 wherein the step of notifying the first subsystem of the occurrence of the trap condition comprises selectively notifying according to the category of the trap condition.

5. A method as in claim 3 wherein the step of archiving data comprises selectively archiving according to the category of the trap condition.

6. A method as in claim 1 and further comprising classifying the time-stamped data as belonging to one of a plurality of classes.

7. A method as in claim 6 wherein the step of archiving data comprises selectively archiving according to the class of the data.

8. A method as in claim 1 wherein the step of archiving data comprises performing an interruptive procedure.

9. A distributed system comprising:

a first interacting subsystem including a first clock means, a first sensor operative to detect occurrence of a trap condition, and first logic means responsive to the clock means and the sensor to automatically determine at what time the trap condition occurs and to automatically send a signal notifying another subsystem of the occurrence of the trap condition and the time of occurrence;

a second interacting subsystem including a second clock means, a buffer, a second sensor operative to automatically collect data respecting the second subsystem, and second logic means responsive to the second clock means to automatically time-stamp data collected by the second sensor and place the time-stamped data in the buffer and responsive to a signal from the first subsystem to automatically archive any of the data in the buffer that carry a time stamp within a desired interval of the time of occurrence of the trap condition and thereby provide a history of the second subsystem during the desired time interval; and communication means operative to carry signals between the first interacting subsystem and the second interacting subsystem.

10. A distributed system as in claim 9 and further comprising means for synchronizing the first and second clock means with each other.

11. A distributed system as in claim 9 wherein the first logic means sends the notification signal selectively according to whether the trap condition belongs to a preselected category.

12. A distributed system as in claim 9 wherein the second logic means archives the data selectively according to whether the data belong to a preselected class.

13. A distributed system as in claim 9 and further comprising means responsive to the second logic means to interrupt a portion of the distributed system at a time determined by the time of occurrence of the trap condition.

14. A distributed system as in claim 9 and further comprising a central controller having a central memory, the second logic means being operative to send any time-stamped data which is to be archived to the central memory for archival storage and the communication means being operative to carry signals between the first and second interacting subsystems and the central controller.

15. In a distributed system of the kind having a plurality of interacting subsystems and communication means therebetween, each interacting subsystem having a local controller and a sensor for gathering data respecting that interacting subsystem, an improvement for monitoring the distributed system over time, the improvement comprising:

a first local clock reference and a first local buffer in communication with the local controller of a first one of the interacting subsystems;

means in the local controller of the first interacting subsystem for automatically time-stamping data gathered by the sensor and placing the time-stamped data in the first local buffer;

a second local clock reference in communication with the local controller of a second one of the interacting subsystems;

means in the local controller of the second interacting subsystem for automatically detecting occurrence of a trap condition from data gathered by the sensor of the second interacting subsystem, determining at what time said trap condition occurs, and notifying the first interacting subsystem of the occurrence of the trap condition and the time of said occurrence; and means in the local controller of the first interacting subsystem for automatically archiving any time-stamped data in the buffer that carry a time stamp within a desired interval of the time of occurrence of the trap condition and thereby providing a history of the first subsystem during the desired time interval.

16. An improvement as in claim 15 and further comprising means for synchronizing the first local clock reference with the second local clock reference.

17. An improvement as in claim 15 and further comprising:

means in the second subsystem local controller for categorizing a trap condition as belonging to one of a plurality of categories; and means in the first subsystem local controller for classifying an item of time-stamped data as belonging to one of a plurality of classes and for archiving the data selectively according to the class of the data and the category of the trap condition.

18. An improvement as in claim 15 and further comprising means in the second subsystem local controller for categorizing a trap condition as belonging to one of a plurality of categories and sending the notification signal selectively according to the category of the trap condition.

* * * * *